L. M. VOSS.
SAP HEATER.
APPLICATION FILED JUNE 14, 1910.

1,023,896.

Patented Apr. 23, 1912.
2 SHEETS—SHEET 2.

Witnesses

Inventor
Leslie M. Voss,
By
Attorneys

UNITED STATES PATENT OFFICE.

LESLIE M. VOSS, OF FILLMORE, NEW YORK.

SAP-HEATER.

1,023,896.   Specification of Letters Patent.   Patented Apr. 23, 1912.

Application filed June 14, 1910. Serial No. 566,864.

*To all whom it may concern:*

Be it known that I, LESLIE M. VOSS, a citizen of the United States, residing at Fillmore, in the county of Allegany, State of New York, have invented certain new and useful Improvements in Sap-Heaters; and I do hereby declare the following to be a full, clear, and exact description of the invention, such as will enable others skilled in the art to which it appertains to make and use the same.

This invention relates to improvements in heaters more particularly devices for heating maple sap prior to its conversion into sugar or syrup, and has for one of its objects to improve the construction and increase the efficiency and utility of devices of this character.

Another object of the invention is to provide a simply constructed device wherein the heat generated from the smoke stack of an evaporating pan is utilized to heat the sap prior to its being conducted into the evaporating pan.

Another object of the invention is to provide a device of this character wherein provision is made for controlling the flow of the sap therethrough.

With these and other objects in view, the invention consists in certain novel features of construction as hereinafter shown and described and then specifically pointed out in the claims.

Figure 1:
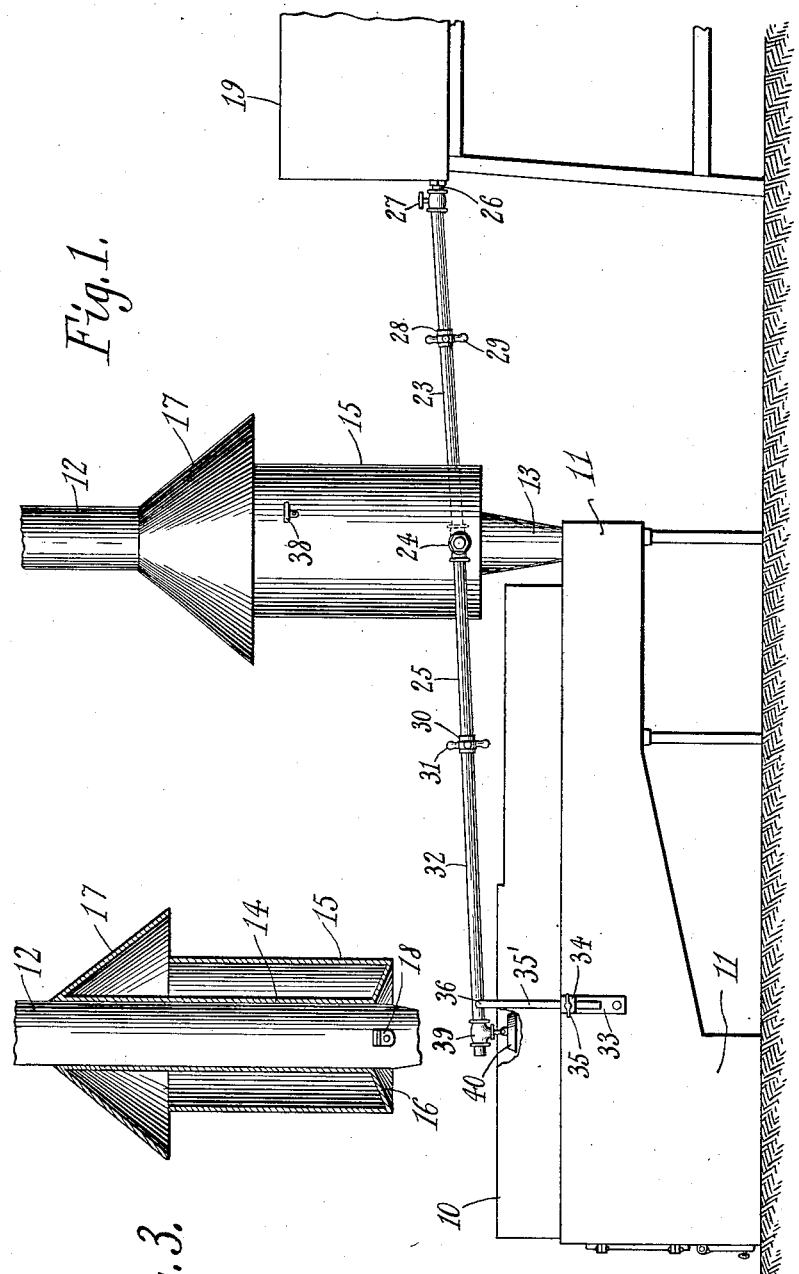
Figure 2:
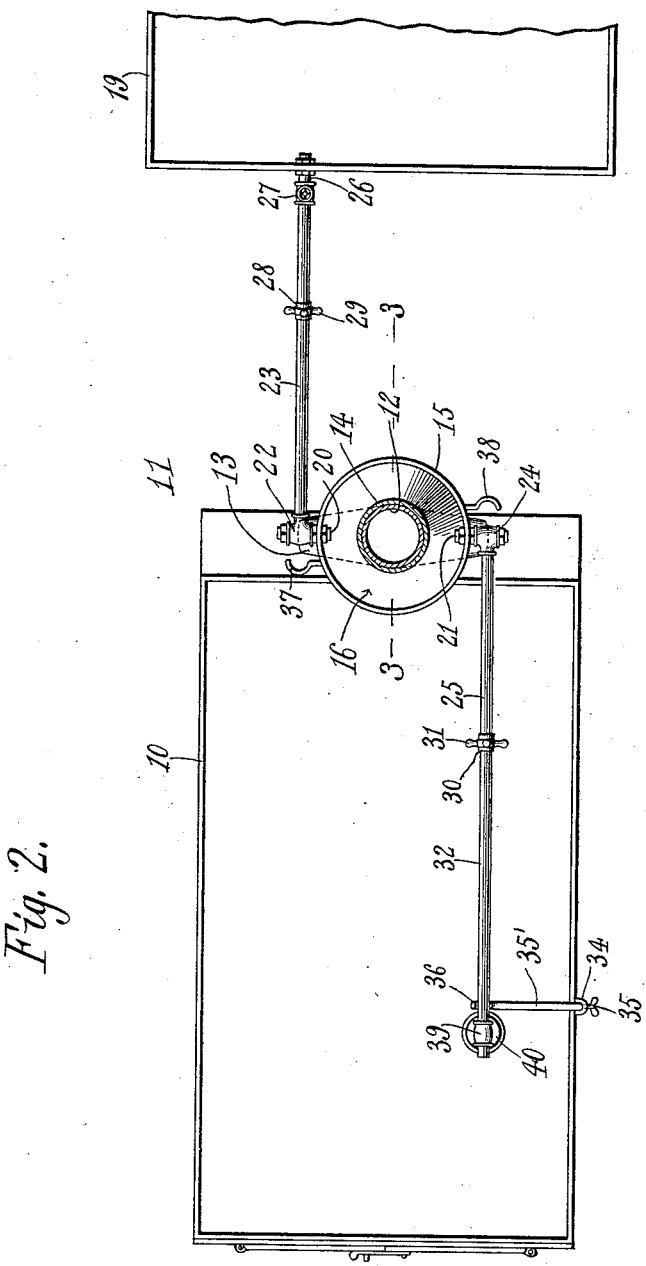

The improved device may be employed without material structural changes in connection with any heating apparatus having a smokestack connected therewith, but, as before stated, is designed more particularly for use in connection with sugar evaporating apparatus, and for the purpose of illustration is shown applied to a conventional device of this character, and in the drawings thus employed, Figure 1 is a side elevation of the improved apparatus, Fig. 2 is a plan view of the same in section on the line 2—2 of Fig. 1, Fig. 3 is a section of the heater portion of the improved device on the line 3—3 of Fig. 2.

The improved apparatus comprises in general a receiver for the sap to be heated which is annular in construction and adapted to be located around the smoke stack of an evaporating pan, the pan being represented as a whole at 10 and mounted upon the usual supporting "arch" 11 and provided with a smoke stack 12, the latter being extended laterally at the lower end as shown at 13 to correspond to the width of the arch, the expanded portion being oblong transversely and merging into the circular portion 12 of the stack, in the usual manner. The improved heater device is located around the cylindrical portion of the stack and comprises an inner annular member 14 and an outer annular member 15 spaced apart, the space between the members 14—15 constituting the tank or receiver for the sap. The two members 14—15 are connected at their lower ends by an annular downwardly and outwardly inclined member 16, so that the outer member 15 extends below the line of the inner member 14. By this means the receiver is formed with an outwardly and downwardly inclined bottom so that when the sap is practically exhausted from the receiver no portion of the sap will remain in contact with the highly heated inner member 14. By this means no danger exists of burning the sap when the quantity is reduced to a very small amount. This is an important feature of the improved device, and effectually prevents all danger of the contents of the heater being burned when the quantity has been reduced to a very small amount. At its upper end the outer member 15 is provided with a laterally enlarged hood 17 into which the steam and vapors which may be generated in the heater will rise and escape around its lower edge thus avoiding all danger of the steam and vapors forcing the sap back into the tank and injuriously affecting the sap. At the same time the hood 17 effectually prevents the entrance of all foreign matter into the heater, thus effectually protecting the sap contained therein. This hood member is therefore also an important feature of the improved device.

The heater is supported in any suitable manner upon the stack, preferably by cleats 18 so that it may be readily attached to or detached from the stack, and will be located with its lower end at a sufficient distance above the pan 10 to permit the latter to be placed upon the arch and removed therefrom without interfering with the heater. The source of supply of the sap is represented conventionally at 19, and may be located at any required distance from the stack and heater, but will preferably be arranged with its lower end above the lower end of the heater so that the sap will flow from the supply reservoir into the heater. Leading from the outer member 15 of the heater, preferably at the bottom and at opposite sides thereof are two pipes, an intake pipe 20 and a discharge pipe 21. The pipe 20 is provided with a swivel coupling 22 to which a supply pipe 23 is connected, while the pipe 21 is provided with a swivel coupling 24 with which a discharge pipe 25 is connected. By this arrangement the pipes 23—25 may be turned up in parallel relations to the heater when not in use, as hereinafter explained.

The storage reservoir 19 is provided with a discharge pipe 26 having a stop valve 27, while the pipe 23 is provided with a union or coupling 28 adapted to be engaged with the terminal of the discharge 26, so that the supply of sap may be conducted to the heater. The union or coupling 28 is formed with suitable means such as finger grips 29 to enable it to be attached and detached manually. At its free end the discharge pipe 25 is provided with a union coupling 30 similar to the coupling 28 and provided with finger grips 31 to enable it to be manually operated, the union 30 providing means for coupling an extension pipe 32 thereto, as shown. By this means the members 25—32 may be disconnected when required and the members 23—25 turned upwardly out of the way when not in use.

Connected to one side of the "arch" structure 11 is a bracket device 33 having a socket 34 at its upper end and provided with a set screw 35, and adjustably supported in this socket is the vertical member of an L-shaped rod 35′, the horizontal member of the rod having a loop 36 through which the extension 32 passes and by which it is supported. By this simple arrangement the connected pipes 25—32 may be adjusted vertically to any required extent within the range of the vertical portion of the L-shaped rod 35. By this simple arrangement the flow through the pipes may be controlled by adjusting the L-shaped rod vertically, as will be obvious. Connected to the free end of the pipe 32 is a controlling device whereby the flow of the liquid may be automatically cut-off when it rises to a certain predetermined point in the pan, and for the purpose of illustration a conventional device of this character is represented at 39 and provided with a float 40 with which the sap engages when it rises to a certain predetermined point and thus cuts-off the further flow. By means of the adjustable rod 35′ the position of the float 40 may be located at any desired point, and thus change the level to which the sap will be permitted to rise. Projecting from the outer member 15 of the heater at opposite sides are hooks 37—38 with which the pipes 23—25 are engaged when elevated into their inoperative position, or when not in use. It will thus be noted that a simply constructed heating device is produced, which may be readily applied to the smoke stack, and by means of which the heat radiating from the smoke stack and which has been heretofore wasted, is utilized to heat the sap prior to its passage to the evaporating device, thereby effecting a material saving in the expense of evaporation, as it will require less fuel to produce the evaporation, and will likewise effect a saving in the time required to do the work.

The heater portion of the apparatus may be constructed of any suitable material, but will preferably be of sheet or plate steel and galvanized or otherwise treated to prevent corrosion, and the various pipes connected with the device will also preferably be galvanized for the same purpose.

What is claimed is:—

1. A heater of the class described comprising an annular receptacle adapted to be arranged around a smoke stack with a laterally extended annular steam and vapor chamber at the upper end communicating with the interior of the receptacle, an intake pipe and a discharge pipe swingingly connected respectively to said tank, and supporting means for said pipes connected to said heater to maintain the pipes in inoperative position.

2. The combination with an evaporating apparatus including a supporting arch a smoke stack and an evaporating pan, of an annular receptacle arranged around said smoke stack, an intake pipe leading into said receptacle and adapted to be detachably connected to a source of supply, a discharge pipe leading from said receptacle in position to conduct the contents thereof to the pan, supporting means for said discharge pipe, means for adjusting said supporting means said pipes being adapted to be swung out of operative position, and means carried by said receptacle for holding said pipes when in inoperative position.

In testimony whereof, I affix my signature, in presence of two witnesses.

LESLIE M. VOSS.

Witnesses:
CHARLES VOSS,
E. P. MANE.